United States Patent Office 3,372,135
Patented Mar. 5, 1968

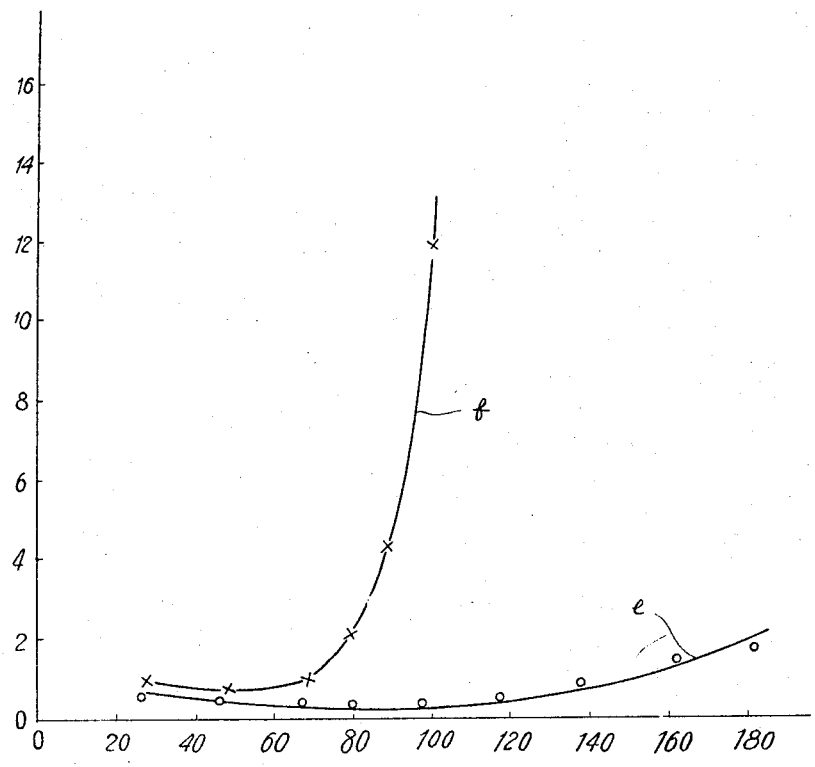

3,372,135
SILICONE VARNISH
Tamotsu Wada, Tokyo, and Mitsuo Ishizaka, Yokohama-shi, Japan, assignors to Tokyo Shibaura Electric Co., Ltd., Kawasaki-shi, Japan, a Japanese corporation
Filed Dec. 12, 1963, Ser. No. 330,155
Claims priority, application Japan, Dec. 13, 1962, 37/55,086
16 Claims. (Cl. 260—33.9)

ABSTRACT OF THE DISCLOSURE

Silicone varnish that may be dried at low temperatures and method of preparing the same comprising a silicone resin solution, and either a complex metal hydroxide having a metal atom such as Ni, Cu, Co, and Cr coordinated with amines or with both amines and water, or, a complex salt having the complex metal hydroxide reacted with an organic acid.

---

This invention relates to a method of preparing a silicone varnish, and more particularly to a method of preparing a silicone varnish which can be cured at a low temperature.

In order to impart sufficient mechanical and electrical properties to a silicone varnish having good heat resistant properties it is necessary to bake the varnish for a long period of time at a temperature (200–250° C.) comparatively higher than that of the conventional organic varnishes. This constitutes one of serious problems encountered in applying silicone varnish as the electrical insulation of electric machines.

In order to eliminate the above mentioned difficulty extensive research was conducted. Improvements have been made including (1) selecting the composition of the silicone varnish so as to be rich in trifunctional units and (2) incorporating, catalysts to improve the curing characteristic of the varnish. These catalysts are metallic soaps, salts of lead, zinc, iron, cobalt, nickel and the like, amines or a strong basic substance, such as sodium hydroxide, potassium hydroxide, cesium hydroxide, tetraalkyl ammonium hydroxide and tetraalkyl phosphonium hydroxide. However, while the product produced by the method (1) can be cured at a temperature between room temperature and 150° C. the cured film is brittle and is sticky when heated to an elevated temperature so that this method is not practical. On the other hand the silicone varnish having a metallic soap therein in accordance with process (2) has poor shelf stability and the cured film greatly deteriorates depending upon the type of the metallic soap used. When using amines, the desired results can not be obtained unless a substantial amount of amines are incorporated which impairs shelf stability as well as heat resistant property of the varnish. Incorporation of a strong basic substance not only affects the shelf characteristic of the varnish but also deteriorates the films formed by applying the varnish. This tendency is especially marked when using utilizing inorganic basic materials. It is also well known in the art to add an organic acid such as acetic acid or an organic basic substance in the form of a neutralized salt when utilizing the organic basic substance in order to improve the shelf stability of the silicone varnish. According to this method a varnish can be obtained which can be cured at a relatively low temperature, that is at a temperature from room temperature to 150° C. and yet can produce a film having good heat resistance. But since the decomposition temperature of the catalyst is high, it remains in the film in an undecomposed state so that it affects the electrical properties at elevated temperatures, especially the dielectric loss.

Accordingly an object of this invention is to provide a novel silicone varnish which can be cured at a relatively low temperature in a range from room temperature to about 150° C. and which can form a superior film having good electrical insulating properties.

Another object of this invention is to provide a silicone varnish which can be cured at a relatively low temperature and in a short time and yet can provide a film having excellent flexibility and heat resistant characteristics.

A still further object of this invention is to provide a new and improved silicone varnish which is stable and can be stored over a long period of time.

While the specification concludes with claims particularly pointing out and distinctly claiming the subject matter regarded as this invention, it is believed that the invention will be better understood from the following description taken in connection with the accompanying drawing in which a single figure has a curve showing the relationship between the dielectric loss and temperature according to one example of the silicone varnish of this invention and of a conventional low temperature curing silicone varnish.

Generally, in accordance with this invention chlorosilanes are hydrolized and polymerized, said cholorsilanes having an organo polysiloxane resin composition represented by the general formula of $$R_n SiO_{\frac{4-n}{2}}$$

where R represents an organic radical such as an alkyl radical, i.e. methyl, ethyl, propyl, butyl, isobutyl and like radicals; and an an aryl radical such as alkenyl, phenyl, naphthyl, anthracyl, tryl, xylyl, ethylphenyl and like radicals, and $1 \leq n \leq 2$. The polymer is then dissolved in a suitable solvent such as benzene, toluene, xylene, diacetonealcohol, propylalcohol, butylalcohol, isobutylcarbinol to obtain a solution of the organopolysiloxane resin having desired viscosity. To the solution is then incorporated a complex metal compound using a drying catalyst in the amount of 0.1 to 3.0% by weight based on the resin component, said catalyst being selected from a group consisting of (1) one or more complex hydroxides represented by the general formula 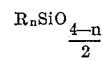, where M represents a metal atom which forms a complex compound, such as palladium, copper, nickel, cobalt, lead, zinc, cadmium, iron, manganese, magnesium, chromium, platinum, rhodium, iridium, ruthenium, osmium; X represents a ligand such as ammonia, ethylendiamine (en), trimethylenediamine (trim), diethylenetriamine (dien), triethylenetetramine (trien), pyridin (py), dipyridyl (dip), water, Y a hydroxy radical, $a$ the number of the ligands which are integers from 2 to 6, and $b$ the number of hydroxyl groups which are integers of 2 and 3, and (2) a complex salt compounded by said complex hydroxide and a monobasic organic acid such as formic acid, acetic acid, propionic acid, caprylic acid, capronic acid, oleic aid, stealic acid and the like or a dibasic organic acid such as oxalic acid, malonic acid, succinic acid and the like. By this method it is easy to provide silicone varnishes which form a resinous film which not only can be cured very quickly but also have excellent shelf stability and good high temperature electrical characteristics. When using a complex hydroxide and an organic acid they can be simultaneously incorporated into the solution of polysiloxane resin to effect reaction between them in solution or alternately they can be mixed to form a neutralized salt which is subsequently added to the solution of the polysiloxane resin.

The complex hydroxide to be incorporated into the solution of an organopolysiloxane resin can be prepared by a conventional method wherein at first a complex salt represented by said general formula [MX$_a$]Y$_b$ where Y is chlorine, bromine or iodine, and then the complex salt is converted into a corresponding hydroxide on treatment with moist silver oxide. However, in case when the metal atom is manganese, magnesium and the like, the yield of the reaction is low. It is to be understood that said ligand to be combined with the metal atom comprises two or more species and the number of $a$ and $b$ are dependent upon the type of the metal atom used, and type and number of the ligands. The hydroxide represented by said general formula may include, for instance,

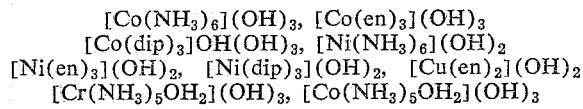

[Co(NH$_3$)$_4$(OH$_2$)$_2$](OH)$_3$ and the like. The complex salt used may be a complex salt prepared by neutralizing the complex hydroxide with an organic acid or complex salt compounds which are directly synthetized such as

[Co(en)$_3$](OCOCH$_3$)$_3$, [Ni(en)$_3$](OCOCH$_3$)$_2$
[Ni(en)$_2$(H$_2$O)$_2$](OCOCH$_3$)$_2$, [Ni(trim)$_3$](OCOCH$_3$)$_2$

[Cu(en)$_2$](OCOCH$_3$)$_2$ wherein cobalt acetate, nickel acetate, copper acetate are combined with ethylenediamine and trimethylenediamine. As the complex metal compound to be utilized in practicing this invention, it is preferable to use a neutralized salt of a reaction product of a complex hydroxide and an organic acid or a directly synthetized complex salt rather than using a complex hydroxide because such complex metal compounds are more stable and provide silicone varnishes having improved shelf stability. Use of these complex metal compounds in an amount of less than 0.1 percent, by weight, based on the resin component will result in poor drying property whereas over 3.0 percent, by weight, may provide similar drying property but does not provide any additional merit and is rather uneconomical. The quality of carboxylic acid to be incorporated as the stabilizer is not necessarily an equivalent amount.

According to this invention, even a solution of polysiloxane resin of the composition which ordinarily has to be cured at a temperature between 200 to 250° C. for more than one hour can be cured in a shorter time at a lower temperature ranging from room temperature to 150° C. by the addition of said complex metal compound. Thus, the varnish can be easily cured by infrared ray lamps and the like which greatly simplifies the curing procedure. Furthermore, the varnish can be advantageously applied to machines which operate at elevated temperatures above 200° C., for instance. The film formed by this varnish does not stick or adhere even when it is subjected to an elevated temperature, after being cured at a low temperature as above described. Moreover these complex metal compounds easily undergo decomposition at a low temperature, thus providing films of excellent electrical and heat resistant properties. Yet the varnish gives no storage problem as is common to varnishes having good drying properties.

The following examples are given by way of illustration:

*Example 1*

To an organopolysiloxane resin having a composition of R/Si=1.53 and CH$_3$/C$_6$H$_5$=1.35 where R represents a methyl radical and a phenyl radical, CH$_3$ a methyl radical and C$_6$H$_5$ a phenyl radical, is added to a mixed solvent comprising xylene and butanol (1:1) to obtain a solution containing 60% of resin component. Silicone varnishes were prepared by incorporating in the solution one of the complex compounds:

(A) [Co(en)$_3$](OH)$_3$; (B) [Ni(en)$_3$](OH)$_2$; and (C) [Cu(en)$_2$](OH)$_2$, and for comparison a silicone varnish (D) to which no catalyst has been added was also prepared. The results of tests made upon drying and heat resistant characteristics of these varnishes are shown in the Table I below.

TABLE I

| | Sample | | | |
|---|---|---|---|---|
| | A | B | C | D |
| Amount of catalyst added (percent) [1] | 0.3 | 0.5 | 0.7 | |
| Drying characteristic [2] | 150° C., 30 min | 150° C., 30 min | 150° C., 15 min | 200° C., 2 hours. |
| Heat adhesive characteristic curing rate determined by hot tach test.[3] | 150° C., 30 min | 150° C., 30 min | 150° C., 30 min | 200° C., 3 hours. |
| Weight loss (percent), 250° C., 72 hours [2] | 7.7 | 7.4 | 7.0 | 9.0. |
| Heat endurance at 250° C. Flex Life 3 mm. φ mandrel.[2] | >1,000 hours | >1,000 hours | >1,000 hours | >1,000 hours. |

[1] Weight percent based on the resin component.
[2] Measured by JISC 2122 (1958).
[3] This is a drying condition wherein an asbestos paper, 0.3 mm. x 25.4 mm. x 100 mm., was placed on a dried test piece, an iron piece (125 g.), 25 mm. x 25 mm. x 25 mm., was put on the asbestos paper and the assembly was heated at 200° C. for 15 minutes at which the asbestos paper will easily fall off.

As will be clearly noted from Table I, the sample D which does not contain a catalyst requires a drying time of 2 hours at 200° C., whereas the silicone varnishes of this invention (samples A, B and C) dry in 30 minutes at 150° C. Thus notwithstanding this lower drying temperature the required drying time is greatly reduced. Moreover, the silicone varnishes of this invention do not exhibit any adhesive property at elevated temperatures and their heat resistant property is good as evidenced by high value (i.e. over 1000 hours) of bending resistance characteristic.

*Example 2*

To the same polysiloxane resin solution as described in Example 1 there was added 0.5%, by weight, based on the weight of the resin, of [Ni(en)$_3$](OH)$_2$ and an equivalent amount of acetic acid was added to the complex metal hydroxide to obtain another sample E of the silicone varnish. For comparison a sample F was similarly prepared by adding to the same polysiloxane resin solution 0.5%, by weight, of (CH$_3$)$_4$NOCOCH$_3$ which are well known in the art. The samples E and F were respectively applied on an iron plate and heated to cure at 150° C. for 3 hours. Table II below shows the volume resistivity and electric strength of the cured films obtained from these samples and the relation between their dielectric loss and temperature is shown by the curves $e$ and $f$ of the accompanying drawing. In this drawing the abscissa represents the temperature in degrees centigrade, the ordinate the dielectric loss percentage, curves $e$ and $f$ represent the dielectric loss at various temperatures of the samples E and F, respectively.

TABLE II

| | Volume Resistivity (Ω-cm.) | | Electric Strength (kv./0.1 mm.) | |
|---|---|---|---|---|
| Sample | Dry | After immersion in water for 24 hours | Dry | After immersion in water for 24 hours |
| E | 2.0×10$^{16}$ | 2.0×10$^{16}$ | 7.9 | 7.9 |
| F | 3.0×10$^{16}$ | 2.8×10$^{16}$ | 7.5 | 7.5 |

As shown in Table II, the volume resistivity at room temperature is substantially the same for both samples E and F but as shown in the accompanying drawing the dielectric loss of sample F increases abruptly at relatively low temperatures below 100° C. whereas that of sample E is very small and of the order of only two percent even at 180° C. It is thought that this is due to the fact that $(CH_3)_4NOCOCH_3$ compound remains in the film in undecomposed condition while the catalyst in sample E undergoes decomposition so that it does not affect the electrical characteristics of the varnish film.

Example 3

To each of various polysiloxane resins each having the compositions: (I) $R/Si=1.70$, $CH_3/C_6H_5=1.50$, (II) $R/Si=1.56$, $CH_3/C_6H_5=1.37$, and (III) $R/Si=1.47$, $CH_3/C_6H_5=1.27$, where R represents methyl and phenyl radicals, $CH_3$, a methyl radical and $C_6H_5$, a phenyl radical; there was added mixed solvent comprising xylene and butanol (1:1) to obtain polysiloxane solutions each containing 60% of resin component. Thereafter 1.0%, by weight (based on the resin component), of $$[Ni(en)_3](OH)_2$$

was incorporated to each of said polysiloxane resin solutions, and then acetic acid, acting as the stabilizer was added in an equivalent amount to each of said complex metal hydroxides. For comparison similar polysiloxane varnishes were prepared without adding the catalyst to the respective resin solutions. The results of tests made on these samples are shown in the Table III below, the conditions of the tests being the same as described in the remark regarding Table I.

TABLE IV

| | Sample | |
|---|---|---|
| | G | H |
| Curing temperature and time: | | |
| 90° C | 3 hrs | 1 hr. and 40 min. |
| 110° C | 2 hrs | 40 min. |
| 130° C | 30 min | 20 min. |
| 150° C | 15 min | 10 min. |
| Weight loss (percent) after 72 hrs. at 250° C. | 4.8 | 4.7. |
| Heat endurance at 250° C., flex life, 3 mm. φ mandrel. | >1,000 hrs | >1,000 hrs. |
| Electric strength (kv./0.1 mm.): | | |
| Dry | 8.0 | 8.5. |
| After immersion in water for 24 hours. | 7.8 | 8.1. |
| Volume resistivity (Ω-cm.): | | |
| Dry | Over $2.1 \times 10^{16}$ | Over $2.3 \times 10^{16}$. |
| After immersion in water for 24 hours. | Over $2.1 \times 10^{16}$ | Over $2.3 \times 10^{16}$. |
| Dielectric loss tangent (percent): | | |
| 25° C | 0.61 | 0.68. |
| 180° C | 1.75 | 2.35. |
| Stability | Did not gel after standing at room temperature for 6 months. | |

Example 6

An aqueous solution containing copper acetate and ethylenediamine in the molar ratio of 1:2 was condensed by evaporation to synthesize $[Cu(en)_2](OCOCH_3)_2$ and this complex metal salt was added to the polysiloxane resin solution of Example 1 in an amount of 0.5% by weight based on the resin component to obtain a polysiloxane varnish. This varnish was tested in the same manner as in Example 1 and the test results showed that

TABLE III

| | Sample | | | | | |
|---|---|---|---|---|---|---|
| | I | | II | | III | |
| Amount of catalyst added (percent) | 0 | 1.0 | 0 | 1.0 | 0 | 1.0 |
| Drying temperature (° C) | 250 | 200 | 200 | 150 100 | 150 | 100 50 |
| Drying time | Over 6 hrs. | 3.5 hrs. | 1 hr. | 10 min. 40 min. | 10 min. | 10 min. 1 hr. |
| Weight loss (percent) after 22 hrs. at 250° C | 5.8 | 5.1 | 7.2 | 4.4 | 8.5 | 3.9 |
| Heat endurance at 250° C., flex life 3 mm. φ mandrel | Over 1,000 | 1,000 | 300 | 300 | 50 | 50 |
| Stability | Did not gel after standing at room temperature for 6 months. | | | | | |

Again, according to this invention it is possible to lower the drying temperature by about 50 to 100° C. and the dried films of the varnish embodying this invention are not adhesive at elevated temperatures. Moreover their weight loss is small and their resistance to heat is excellent.

Example 4

A silicone varnish was prepared by incorporating 20%, by weight based on the weight of resin component, of $[Ni(dip)_3](OH)_2$ into the same polysiloxane resin solution as in Example 1 and tested in same manner as in Example 1. The results showed that drying time was 30 minutes at 150° C., weight loss was 7.0% and the bending resistant characteristic was over 1000 hours.

Example 5

$[Ni(en)_3](OCOCH_3)_2$ was prepared by adding ethylenediamine to an aqueous solution of nickel acetate and dissolved in methanol. Two samples of silicone varnish were prepared by incorporating to the polysiloxane resin solution II of Example 3 said methanol solution, respectively, in an amount of 0.5%, by weight based on the resin component, of $[Ni(en)_3](OCOCH_3)_2$ component (sample G) and of 1.0%, by weight, of $$[Ni(en)_3](OCOCH_3)_2$$

component (sample H). These samples were tested in the same manner as in Example 1, and the results thereof are shown in Table IV below, it being understood that electrical tests were made on samples prepared in the manner as described in Example 2.

the drying time 30 minutes at 150° C. and the flex life at 250° C. characteristic was over 1000 hours.

Example 7

To a concentrated aqueous solution of nickel acetate, ethylenediamine was added at a molar ratio of 1:2, and then the solution was concentrated to a synthesize $$[Ni(en)_2(H_2O)_2](OCOCH_3)_2$$

This complex salt was then added to the polysiloxane resin solution III of Example 3 in an amount of 1.0%, by weight based on the resin component. This varnish was tested by the same drying test method as in Example 1 and it was found that it was dried in 30 minutes at 50° C.

Example 8

Equivalent amounts of $[Co(NH_3)_6]_2(SO_4)_3$ and barium hydroxide were reacted and resulted $$[Co(NH_3)_6](OH)_3$$

was added to the polysiloxane resin solution of Example 1 in an amount of 0.5%, by weight based on the resin component. This varnish was tested by the same method as in Example 1 and it was found that its drying time was fifteen minutes at 150° C. and its bending flex life at 250° C. was over 1000 hours.

Example 9

Aqueous solutions of nickel actate and trimethylenediamine were mixed together in a molar ratio of 1:3, and the resultant $[Ni(trim)_3](OCOCH_3)_2$ was added to the polysiloxane resin solution of Example 1 in an amount of 0.5%, by weight based on the resin component. This varnish was tested by the same method as in Example 1 and it was found that its drying time was 15 minutes at 150° C., weight loss after heating at 250° C. for 72 hours was 5.5% and its flex life at 250° C. was over 1000 hours. Also it was found that this varnish did not gel after standing at room temperature for more than three months.

*Example 10*

$[Cr(NH_3)_5OH_2](OH)_3$ which has been prepared by reacting $[Cr(NH_3)_5Cl]Cl_2$ with silver oxide was incorporated into the polysiloxane varnish III of Example 3 in an amount of 1.0%, by weight based on the resin component. Thereafter propionic acid of equivalent amount with respect to said complex hydroxide was added to the varnish. The drying property of this varnish was tested by the same method as in Example 1 and found that it was 10 minutes at 100° C. and one hour at 50° C.

While the invention has been explained by describing particular embodiments thereof, it will be apparent that improvements and modifications may be made without departing from the scope of the invention as defined in the appended claims.

What we claim is:

1. A silicone varnish comprising an organopolysiloxane resin represented by a general formula of $$R_nSiO_{\frac{4-n}{2}}$$

where R represents a methyl radical and a phenyl radical, the ratio between the methyl radical and the phenyl radical is equal to 1.35 and R/Si=1.53, a mixed solvent comprising xylene and butanol in the ratio of 1:1, said mixed solvent dissolving said organopolysiloxane resin, and 0.3%, by weight based on the resin component, of $[Co(en)_3](OH)_3$ incorporated into said solution.

2. A silicone varnish comprising an organopolysiloxane resin represented by a general formula of $$R_nSiO_{\frac{4-n}{2}}$$

where R represents a methyl radical and a phenyl radical, is equal to 1.35 and R/Si=1.53, a mixed solvent comprising xylene and butanol in the ratio of 1:1, said mixed solvent dissolving said organopolysiloxane resin, and 0.5%, by weight based on the resin component, of $[Ni(en)_3](OH)_2$ incorporated to said solution.

3. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.35 and R/Si=1.53, a mixed solvent comprising xylene and butanol in the ratio of 1:1, said mixed solvent dissolving said organopolysiloxane resin, and 0.7%, by weight based on the resin component, of $$[Cu(en)_2](OH)_2$$

incorporated to said solution.

4. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.35 and R/Si=1.53, a mixed solvent comprising xylene and butanol in the ratio of 1:1 said mixed solvent dissolving said organopolysiloxane resin to form a resin solution, and 0.5%, by weight based on the resin component, of a complex hydroxide $[Ni(en)_3](OH)_2$ and acetic acid of the amount equivalent to that of said complex hydroxide.

5. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.50 and R/Si=1.70, a mixed solvent comprising xylene and butanol in the ratio of 1:1, said mixed solvent dissolving said organopolysiloxane resin to form a resin solution, and 1.0%, by weight based on the resin component, of a complex hydroxide $[Ni(en)_3](OH)_2$ and acetic acid of the amount equivalent to that of said complex hydroxide.

6. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.37 and R/Si=1.56, a mixed solvent comprising xylene and butanol in the ratio of 1:1, said mixed solvent dissolving said organopolysiloxane resin to form a resin solution, and 0.5%, by weight based on the resin component, of a complex hydroxide $[Ni(en)_3](OH)_2$ and acetic acid of the amount equivalent to that of said complex hydroxide.

7. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.27 and R/Si=1.47, a mixed solvent comprising xylene and butanol in the ratio of 1:1, said mixed solvent dissolving said organopolysiloxane resin to form a resin solution, and 1.0%, by weight based on said resin component, of a complex hydroxide $[Ni(en)_3](OH)_2$ and acetic acid of the amount equivalent to that of said complex hydroxide.

8. A silicone varnish comprising an organopolysiloxane resin represented by a general formula of $$R_nSiO_{\frac{4-n}{2}}$$

where R represents a methyl radical and a phenyl radical, the ratio between methyl and phenyl radicals is equal to 1.35 and R/Si=1.53, a mixed solvent comprising xylene and butanol in the ratio of 1:1, said mixed solvent dissolving said organopolysiloxane resin to form a solution and 2.0%, by weight based on the resin component, of $[Ni(dip)_3](OH)_2$ incorporated into said solution.

9. A silicone varnish comprising an organopolysiloxane resin represented by a general formula $$R_nSiO_{\frac{4-n}{2}}$$

where R represents a methyl radical and a phenyl radical, the ratio between the methyl and phenyl radicals is equal to 1.37 and R/Si=1.56, a mixed solvent comprising xylene and butanol in the ratio of 1:1, said mixed solvent dissolving said organopolysiloxane resin to form a resin solution and 0.5%, by weight based on the resin component, of $[Ni(en)_3](OCOCH_3)_2$ incorporated into said solution.

10. A silicone varnish according to claim 8 wherein the amount of $[Ni(en)_3](OCOCH_3)_2$ is 1.0%, by weight.

11. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.35 and R/Si=1.53, a mixed solvent comprising xylene and butanol in the ratio of 1:1, said mixed solvent dissolving said organopolysiloxane resin to form a resin solution and 0.5%, by weight based on the resin component, of [Cu(en)$_2$](OCOCH$_3$)$_2$ incorporated into said resin solution.

12. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.27 and R/Si=1.47, a mixed solvent comprising xylene and butanol in the ratio of 1:1, said mixed solvent dissolving said organopolysiloxane resin to form a resin solution and 1.0%, by weight based on the resin component, of [Ni(en)$_2$(H$_2$O)$_2$](OCOCH$_3$)$_2$.

13. A silicone varnish comprising an organopolysiloxane resin represented by a general formula of $$R_nSiO_{\frac{3-n}{2}}$$

where R represents a methyl radical and a phenyl radical, the ratio between the methyl and phenyl radicals is equal to 1.27 and R/Si=1.47, a mixed solvent comprising xylene and butanol in the ratio of 1:1, said mixed solvent dissolving said organopolysiloxane resin to form a resin solution and 0.5%, by weight based on the resin component, of [Co(NH$_3$)$_6$](OH)$_3$ incorporated into said solution.

14. A silicone varnish comprising an organopolysiloxane resin represented by a general formula of $$R_nSiO_{\frac{4-n}{2}}$$

where R represents a methyl radical and a phenyl radical, the ratio between the methyl and phenyl radicals is equal to 1.35 and R/Si=1.53, a mixed solvent comprising xylene and butanol in the ratio of 1:1, said mixed solvent dissolving said organopolysiloxane resin to form a resin solution and 0.5%, by weight based on the resin component, of [Ni(trim)$_3$](OCOCH$_3$)$_2$ incorporated into said resin solution.

15. A silicone varnish comprising an organopolysiloxane resin represented by a general formula of $$R_nSiO_{\frac{4-n}{2}}$$

where R represents a methyl and a phenyl radical, the ratio between the methyl and phenyl radicals is equal to 1.27 and R/Si=1.47, a mixed solvent comprising xylene and butanol in the ratio of 1:1, said mixed solvent dissolving said organopolysiloxane resin to form a resin solution, and 1.0%, by weight based on the resin component, of complex hydroxide [Cr(NH$_3$)$_5$OH$_2$](OH)$_3$ and propionic acid in an amount equivalent to that of said complex hydroxide.

16. A silicone varnish comprising a solution of an organopolysiloxane resin represented by a general formula $$R_nSiO_{\frac{4-n}{2}}$$

where R represents an organic radical selected from a group consisting of alkyl, aryl and alkenyl radicals and 1=<n=<2, at least 0.3% by weight based on the resin component, of a complex compound represented by the general formula (MX$_a$)Y$_b$, where M represents a metal atom selected from the group consisting of Ni, Cu, Co and Cr which forms a complex compound, X represents a ligand selected from a group consisting of ammonia, ethylenediamine, trimethyldiamine, pyridine, dipyridyl and water, Y represents at least one radical selected from a group consisting of a hydroxyl radical, an acetic acid radical and a propionic acid radical, a, the number of said ligands being integers from 2 to 6 and b, the number of said radicals being integers of 2 and 3; and, a mixed solvent comprising xylene and butanol in the ratio of 1:1 by weight.

References Cited

UNITED STATES PATENTS 3,308,088  3/1967  Wada et al. _____ 260—33.65

MORRIS LIEBMAN, *Primary Examiner.*

R. S. BARON, *Assistant Examiner.*